United States Patent
Wobben

(10) Patent No.: US 8,482,435 B2
(45) Date of Patent: Jul. 9, 2013

(54) WIND TURBINE COMPRISING APPROACH LIGHTING

(76) Inventor: Aloys Wobben, Aurich (DE)

(*) Notice: Subject to any disclaimer, the term of this patent is extended or adjusted under 35 U.S.C. 154(b) by 658 days.

(21) Appl. No.: 12/279,526

(22) PCT Filed: Feb. 12, 2007

(86) PCT No.: PCT/EP2007/051312
§ 371 (c)(1),
(2), (4) Date: Apr. 20, 2010

(87) PCT Pub. No.: WO2007/093570
PCT Pub. Date: Aug. 23, 2007

(65) Prior Publication Data
US 2010/0194603 A1    Aug. 5, 2010

(30) Foreign Application Priority Data
Feb. 16, 2006  (DE) .................. 10 2006 007 536

(51) Int. Cl.
*G08B 21/00* (2006.01)

(52) U.S. Cl.
USPC ........... 340/983; 340/963; 340/945; 340/953; 340/539.1; 315/149; 416/146 R

(58) Field of Classification Search
USPC ....... 340/983, 963, 945, 953, 539.1; 315/149; 415/146 R
See application file for complete search history.

(56) References Cited

U.S. PATENT DOCUMENTS

| | | | |
|---|---|---|---|
| 4,620,190 A | 10/1986 | Tigwell et al. | |
| 6,013,985 A | 1/2000 | Green et al. | |
| 7,589,641 B2 | 9/2009 | Wobben | |
| 2002/0105432 A1* | 8/2002 | Pederson et al. | 340/815.45 |
| 2003/0156047 A1* | 8/2003 | Wobben | 340/983 |
| 2005/0079052 A1* | 4/2005 | Wobben | 416/5 |
| 2008/0008045 A1* | 1/2008 | Basilico | 367/128 |
| 2010/0004087 A1 | 1/2010 | Minegishi et al. | |

FOREIGN PATENT DOCUMENTS

| | | |
|---|---|---|
| DE | 29710990 U1 | 3/1998 |
| DE | 10005175 A1 | 8/2001 |
| DE | 10231299 A1 | 1/2004 |
| DE | 202004006595 U1 | 8/2004 |
| DE | 10 2005 039 434 A1 | 2/2007 |
| EP | 0 869280 A2 | 10/1998 |
| EP | 1 662 138 A1 | 5/2006 |
| GB | 1383653 | 2/1975 |
| GB | 2315123 A | 1/1998 |
| JP | 2000304885 A | 11/2000 |
| JP | 2002075670 A | 3/2002 |

(Continued)

OTHER PUBLICATIONS

Montgomerie, B., "Obstacle Markings on Wind Turbines for Safe Aviation and Marine Navigation", FOI Memorandum, Swedish Defense Research Agency, Aug. 2004, pp. 1-10.

*Primary Examiner* — Benjamin C Lee
*Assistant Examiner* — Mark Rushing
(74) *Attorney, Agent, or Firm* — Seed IP Law Group PLLC

(57) ABSTRACT

The invention concerns a wind power installation comprising a flight warning light arrangement. In accordance with the invention it is proposed that the flight warning light arrangement is switched on only when a vehicle or craft, preferably an aircraft, approaches the wind power installation to a predetermined spacing.

12 Claims, 2 Drawing Sheets

FOREIGN PATENT DOCUMENTS

| | | |
|---|---|---|
| WO | 97/29320 | 8/1997 |
| WO | 01/86606 A1 | 11/2001 |
| WO | 03/104649 A1 | 12/2003 |
| WO | 2006/092137 A1 | 9/2006 |
| WO | 2008/041687 A1 | 4/2008 |
| WO | 2009/048402 A1 | 4/2009 |
| WO | 2011/128291 A2 | 10/2011 |

* cited by examiner

WIND TURBINE COMPRISING APPROACH LIGHTING

BACKGROUND

1. Technical Field

The invention concerns a wind power installation comprising a flight warning light arrangement.

2. Description of the Related Art

As general state of the art in that respect attention is to be directed to WO 01/86606, WO 97/29320, U.S. Pat. No. 6,013, 985, GB 2 315 123, GB 1 383 653 and U.S. Pat. No. 4,620,190 and the applicable regulations covering the operation of flight warning light arrangements in relation to high buildings, in particular wind power installations.

There are various alternative configurations in relation to those flight warning light arrangements, usually the flight warning light arrangements are in the form of what are referred to as 'flashing lights' so that the result afforded is a 'winking light' which is distinguished by a given duration of being lit up (light phase') and a corresponding 'dark phase' in which the flashing lights are switched off.

Those flight warning light arrangements also serve in particular for orientation purposes for air traffic so as to avoid an aircraft colliding with a wind power installation. The flight warning light arrangements are also used in relation to offshore wind power installations in order reliably to prevent a collision between an offshore wind power installation and a ship or another marine craft. In this situation, the wind power installation acts as a lighthouse for such ships, warning them to stay a certain distance away.

Constant activation of such a flight warning light arrangement might be a problem precisely at night, particularly when the wind power installation or a group of many of them—referred to as a wind park—is or are disposed on land and the wind power installations are in the proximity of a town or occupied houses. Many residents may feel themselves to be disturbed by the flashing lights. Wind power technology as such may also acquire a negative image in that respect.

BRIEF SUMMARY

One goal of the present invention is to reduce the time for which warning light arrangements are illuminated from a wind power installation.

DETAILED DESCRIPTION

According to the invention there is proposed a wind power installation having the features set forth in claim 1 and as set forth in one of the further claims. Advantageous developments are described in the appendant claims.

Figure 1B:
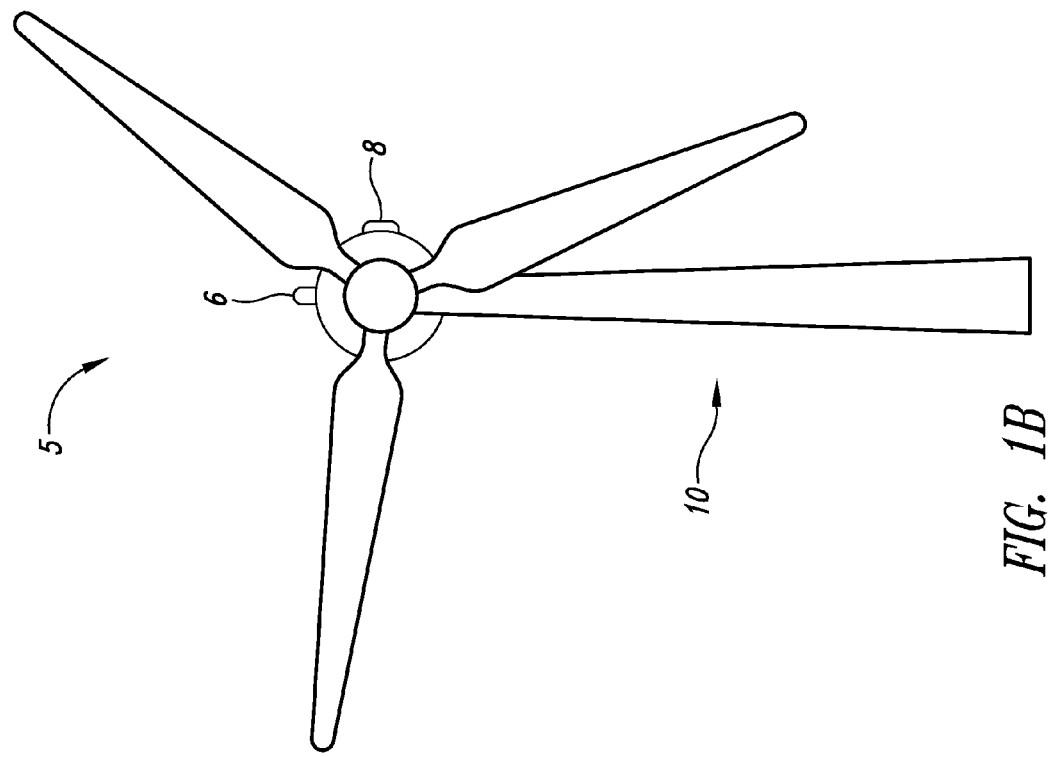
FIG. 1B shows a wind power installation with an alternative embodiment of a warning light according to the present invention.
Figure 1A:
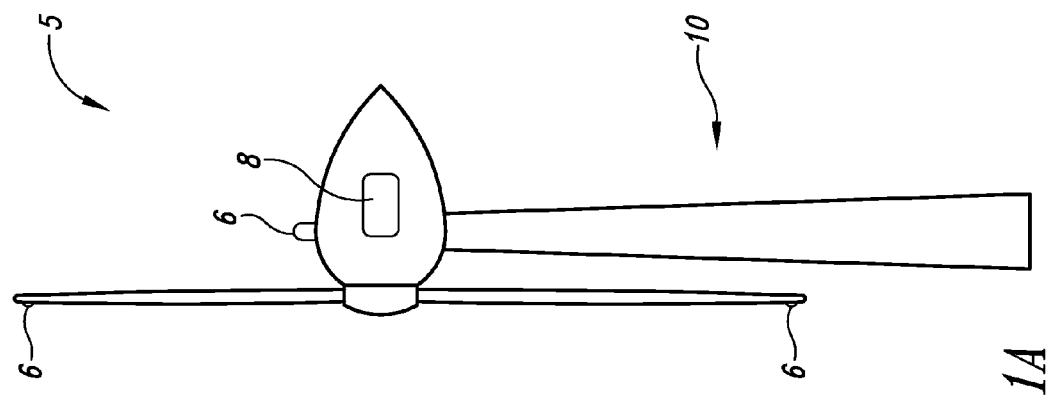
FIG. 1A shows a wind power installation with a warning light according to the present invention.

As shown in FIGS. 1A and 1B, according to the invention lights 6 of a flight warning light arrangement 5 of the wind power installation 10 are generally switched off and therefore do not represent an adverse visual impairment for residents. In FIG. 1A, the lights 6 are at the tips of the rotor blades and on the pod; in FIG. 1B, they are only on the pod. The light or lights 6 of the flight warning light arrangement 5 of the wind power installation—or the flight warning light arrangements 5 of the wind power installations in a wind park—is or are only switched on when an aircraft, a craft, a vehicle or a ship is approaching.

Figure 2:
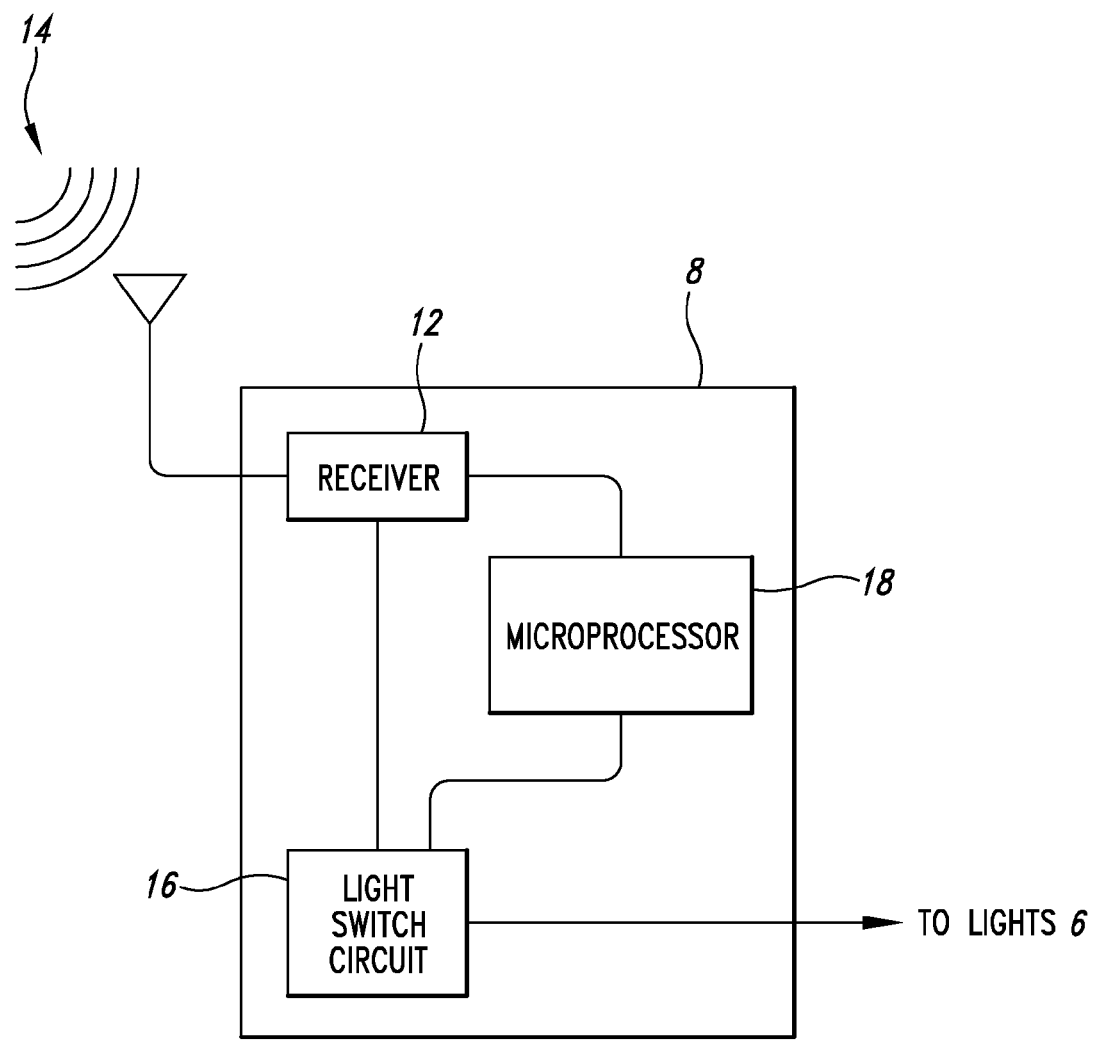
FIG. 2 shows a system for controlling the warning lights of the wind power installation of FIG. 1A or 1B according to the present invention.

Referring jointly to FIGS. 1A and 2, preferably a wind power installation 10 (or at least one wind power installation of a wind park) has one or more lights 6, a light control module 8 that includes a receiver 12 which is capable of receiving a predetermined signal 14 of a predetermined frequency. As long as no signal is received, the lights 6 of the flight warning light arrangement 5 are switched off, in which respect connected downstream of the receiver is a switching means 16 which generates the corresponding switch-on and switch-off signals of the flight warning light arrangements. When a signal 14 is received by the receiver 12 the lights 6 of the flight warning light arrangement are switched on and it thus begins to light up in the usual fashion, for example to adopt a given rhythm or pulse rate in respect of being switched on and off in the form of flashing lights.

In addition and/or alternatively to that proposed solution, switching-on of the lights 6 of the flight warning light arrangement 5 can also be made dependent on the receiving field strength or a distance signal from which the signal is received so that the light 6 is switched on only when the signing craft or vehicle has assumed a predetermined distance in relation to the wind power installation. In that respect, in one embodiment, it may be assumed that the distance of the transmitter and/or movement of the transmitter can be inferred from the receiving field strength. Alternatively, the signal 14 may include data from which distance can be determined, or another parameter which can be evaluated in evaluation of the transmitter signal. As one example, by difference measurement which occurs in succession in respect of time, it may also be possible to ascertain whether the transmitter is approaching the wind power installation and the wind power installation can then derive therefrom a decision as to whether the light of the flight warning light arrangement is switched on, which is appropriate when the measurement which occurs in succession in respect of time indicates an increase in the receiving field strength or close distance. The light 6 of the wind power installation is switched off when the successive receiving field strength measurement or other measurement shows that the transmitter is moving away from the wind power installation.

As a further alternative, when the transmitter is approaching the receiver the flashing rhythm can also be altered, for example increased, by an increase in the receiving field strength, which, when the transmitter is disposed in an aircraft, makes it clear to the pilot of the aircraft that he is possibly excessively closely approaching the wind power installation or the wind power installations of a wind park and he can then also adopt suitable avoidance maneuvers.

A further variant can also provide that the wind power installation not only has a receiver but also a transmitter which always or when the receiver receives a signal from a first transmitter (which for example is disposed in an aircraft), in turn emits a transmission signal which includes the positional co-ordinates of the wind power installation, for example in GPS data format. That signal can be received by the aircraft so that a bidirectional communication between the craft, including a ship, aircraft, vehicle or the like, and the signal from the wind power installation also provides that the pilot (or the autopilot system) in the aircraft (or the captain on the ship), even without the flight warning light arrangement coming on, and recognizes that the craft is in the proximity of a wind power installation (or a wind park) and can implement suitable control of the craft to avoid the wind power installation.

Frequencies on which transmitters and receivers communicate with each other can also be those which are reserved for identification friend or foe in military technology.

If the transmission signal is a digital signal, the distance of the transmitter to the receiver can also be inferred from the error rate by an error recognition means arranged downstream of the receiver and, if the error rate falls below a given error rate threshold, activation of the flight warning light arrangement is then initiated.

Accordingly an error rate recognition means which is arranged downstream of the receiver of the wind power installation can also be used virtually as a substitute parameter for field strength measurement or supplemental thereto in order to generate suitable switching criteria for activating or deactivating the flight warning light arrangement.

Preferably the flight warning light arrangement 5 is also equipped with a microprocessor 18 which records the activation and deactivation times respectively and memorizes them in a memory and in addition those stored data are also passed to a central flight control location (not shown) which can use those data for flight monitoring.

Communication of the data from the wind power installation to such a flight control location is effected by way of conventional technical devices such as VHF, MW, FM, AM, Internet protocols, a modem connection or GSM or the like.

The invention provides that the lights 6 of a flight warning light arrangement 5 are involved in operation considerably less than hitherto, which ultimately serves to prolong the service life of the flight warning lights 6 and further residents of the flight warning light installations are stressed markedly less than hitherto than by the prior art flight warning lights which remain on through the entire night.

It is also particularly advantageous if the transmitter from the craft also communicates a given transmitter-specific identification so that that identification can under some circumstances also be decoded and recorded. That joint transmission of an identification can also be used not to implement activation of the lights 6 in spite of the approach of an aircraft, when that is desired. Thus under some circumstances, in spite of the reception of a signal from a transmitter, activation of the lights 6 by the flight warning light arrangement may not be desired if the situation involves a military use and if a particular identification is also sent, then activation of the light 6 can be prevented if it is apparent from the identification that that identification is on a stored list or an 'index' (a list with corresponding identifications) which are not intended to result in the flight warning lights being switched on or activated in the usual way.

If the flight warning light arrangement 5 has a time switch, the flash rhythm can also be altered by suitable signals to the flight warning lights 6 and preferably also switching-off of the flight warning lights 6 is not implemented immediately after cessation of the transmission signal but the flight warning light arrangement switches off only when a given period of time after reception of the last signal from the transmitter and/or after the reception signal falls below a given threshold value has been reached.

According to the turn-off sequence, in one embodiment, the lights 6 will automatically turn off when a signal is no longer received. According to one alternative, a time delay may be implemented such that ten minutes or some other set time after the signal has ceased to be received, the light 6 will turn off.

As a further alternative, the direction of travel relative to the wind power installation and the distance may also be monitored to cause the light 6 to be turned off. In particular, if the flight warning arrangement 5 has collected data sufficient to recognize that the aircraft has passed its closest approach to the wind power installation and now is heading away from the installation and continues to head away from the installation, the light can be automatically turned off even though the signal is still received. Since the aircraft is traveling away from the wind power installation, the danger of the wind power installation is passed, the lights can then be turned off without impacting the safety of the aircraft. Alternatively, even if the signal is still being received, if it is sufficiently weak to indicate that the aircraft is at some distance away, the lights 6 may be turned off.

In one embodiment, the invention is used in relation to wind power installations in the proximity of an airfield or airport or the like. As another alternative, the invention may be used for wind power installations along the coast or on sea-based platforms. In these instances, the wind power installation is similar to a lighthouse in that it emits a light or beacon letting the ship know that it is approaching land or a platform and thus can stay far away from the lights to avoid a collision. According to this invention, rather than having the lights be on at all times, they would only be switched on in those circumstances in which there is a ship in the vicinity and thus avoid the glare of the lights being present at those times when it is not necessary for its intended purpose.

The flight warning light arrangement 5 can have flashing lights 6 disposed on the pod of a wind power installation. It is however also possible for the light means 6 to be disposed not on the pod but alternatively and/or also at the rotor blades, preferably at the tips thereof as shown in FIG. 1A.

A variant of the invention which is to be in the form of a further alternative to or supplemental to the foregoing description provides that either the craft has an RF-ID tag and/or the wind power installation is equipped with an RF-ID tag. If then the craft and/or also the wind power installation is equipped with an interrogator which is capable of exciting the RF-ID tag to produce a response code signal (that is to say in the case of the aircraft the interrogator radios the RF-ID tag in the wind power installation, or if the wind power installation has an interrogator then it radios the RF-ID tag signal in the aircraft). As soon as the interrogator receives a utilizable response signal from the RF-ID tag that is assessed as a switching signal in order either to switch on the flight warning lights 6 in the manner already described in accordance with the present application or to display within the aircraft cockpit that the aircraft is in the proximity of a wind park.

In this alternative embodiment, the signal is sent to the aircraft warning of the wind power installation, but no light is turned on. The aircraft cockpit is always informed about the approach of the aircraft to the wind park by a signal, not by a light. In particular the reception of an RF-ID tag response signal which is installed on the wind power installation within the cockpit can have the result of practically simulating the situation of light of a flight warning light arrangement for it is not crucial that a flight warning light arrangement of a wind power installation is switched on, but that the vehicle or craft which is approaching the wind park or the wind power installation and which is on a collision course therewith is made aware that the vehicle or craft is approaching the wind power installation or a wind park.

As a further alternative, the wind power installation may itself emit a signal in order to sense approaching aircraft. For example, a small radar transmitter or other signal emitter can be mounted on the pod of the wind power installation. This would be particularly effective for recognizing small aircraft or older aircraft which do not have the appropriate transmission capabilities carried by modern commercial aircraft. In this further alternative embodiment, the wind power installation outputs a signal sensing for aircraft passing the area. If no aircraft is sensed, the lights remain off. If an aircraft is sensed as being in the area and approaching the wind power installation, then the lights are switched on in order to warn the pilot of the presence of the wind power installation. In this particular embodiment, having the lights flash brighter or with an increasing pulse frequency is particularly advantageous if the aircraft approaches too close to the wind power installation. In such a circumstance, the aircraft may be a small private aircraft and the change in frequency of the flashing lights or the increase in brightness would be a further warning to the pilot to stay away from the wind power installation to avoid dangerous flying conditions.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising:
a flight warning light arrangement that is switched on only when a moving craft approaches the wind power installation to within a predetermined spacing, wherein the wind power installation has a receiver which is capable of receiving a signal from a mobile transmitter on the craft and when a predetermined signal is received by the receiver from the craft a light of the flight warning light arrangement is switched on and the light of the flight warning light arrangement is automatically switched off after a predetermined period of time after the signal receiving strength has fallen below a predetermined value, and wherein a rhythm at which the light of the flight warning light arrangement lights up changes upon closer approach of the craft to the wind power installation; and
wherein the flight warning light arrangement is equipped with a microprocessor which records activation and deactivation times of the light and stores the activation and deactivation times in a memory.

2. The wind power installation according to claim 1 wherein the transmission frequency which the transmitter emits is a frequency which is usual in at least one of air travel and shipping.

3. The wind power installation according to claim 1 wherein the signal emitted by the craft, has a predetermined identification which can be decoded by a decoder arranged in the wind power installation and the flight warning light arrangement is switched on when a predetermined identification signal has been decoded.

4. The wind power installation according to claim 1 wherein the flight warning light arrangement is arranged on the pod of the wind power installation.

5. The wind power installation according to claim 1 wherein the light of the flight warning light arrangement is arranged on the rotor blades.

6. The wind power installation according to claim 1 wherein the light of the flight warning light arrangement initially lights up at a predetermined rhythm upon the approach of the craft.

7. The wind power installation according to claim 1 wherein the wind power installation has a time switch and a receiver for a signal for switching on the light of the flight warning light arrangement, wherein the receiving strength of the signal is evaluated in an evaluation means arranged downstream of the receiver and said evaluation signal is passed to the time switch which in turn, in dependence on the strength of the receiving signal~determines at least one of the switch-on duration and the switch-off duration of the light of the flight warning light arrangement.

8. The wind power installation according to claim 1 wherein the craft is an aircraft and the wind power installation is adjacent a flight path of the aircraft.

9. The wind power installation according to claim 1 wherein the craft is a ship and the wind power installation is adjacent a travel path of the ship.

10. The wind power installation according to claim 1 wherein the predetermined value is zero such that the light is switched off when the signal is no longer being detected as being received.

11. A method of illuminating a wind power installation comprising:
receiving a signal indicating a moving craft is within a threshold distance range;
turning on a light to emit light from the wind power installation upon receipt of the signal;
maintaining the light on to continue to emit light while the craft is traveling towards the wind power installation;
emitting light at a selected pulse rate when a signal is initially received from the moving craft;
changing the pulse rate at which light is emitted to a higher frequency when the moving craft comes closer to the wind power installation than a selected threshold; turning the light off to no longer emit light after the craft is traveling away from the wind power installation; and
storing activation and deactivation times of the light in a memory of a flight warning light arrangement of the wind power installation.

12. The method according to claim 11, further comprising: increasing the amount of light which is emitted from the wind power installation as the craft comes closer to the wind power installation.

* * * * *